June 2, 1936. M. SHAKESPEARE 2,042,737

FISHING REEL

Filed June 18, 1934

INVENTOR.
Monroe Shakespeare
BY Chappell & Earl
ATTORNEYS

Patented June 2, 1936

2,042,737

UNITED STATES PATENT OFFICE 2,042,737

FISHING REEL

Monroe Shakespeare, Kalamazoo, Mich., assignor to Shakespeare Company, Kalamazoo, Mich.

Application June 18, 1934, Serial No. 731,188

19 Claims. (Cl. 242—84.4)

The main objects of this invention are:

First, to provide a fishing reel of the level winding type having a line guide carriage provided with an improved pawl assembly, the parts thereof being arranged for convenient manipulation to change the active edge of the pawl.

Second, to provide an improved pawl which is simple and economical to manufacture, the pawl having several faces for selective coaction with the traversing shaft.

Third, to provide a pawl assembly which is simple and economical in its parts and very efficient and effective in operation.

Objects relating to details and economies of my invention will appear from the description to follow. The invention is defined and pointed out in the claims.

A structure which is a preferred embodiment of my invention is illustrated in the accompanying drawing, in which.

Figure 1:
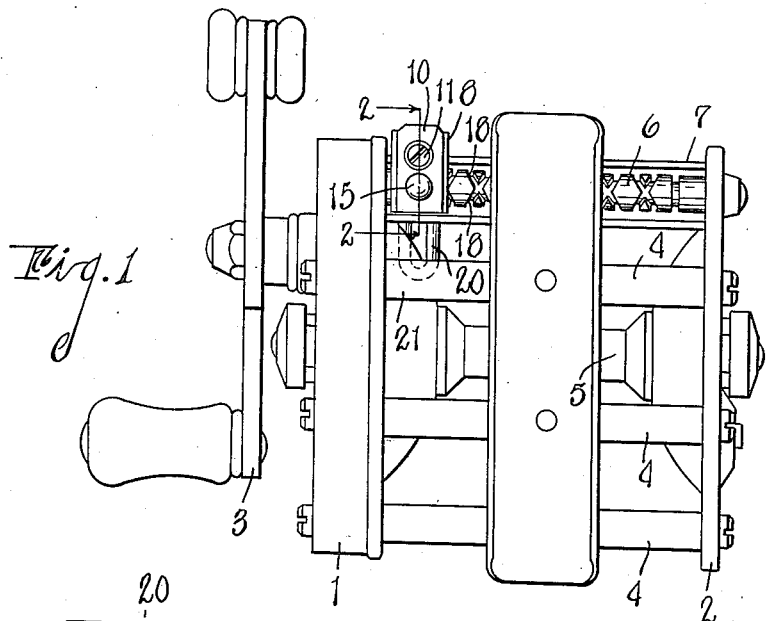
Fig. 1 is an inverted view of a fishing reel embodying the features of my invention.

Referring to the drawing, 1 and 2 are the end members of the reel, the former being in the form of a casing and containing the usual gearing (not shown) and supporting the operating crank 3. The end members are connected by suitable pillars 4. 5 represents the spool.

6 is the reversely grooved line guide carriage traversing shaft which is suitably connected to the crank by means of gearing (not shown). This shaft is provided with a housing 7 of channel cross section.

The line guide carriage 8 is slidingly mounted on the shaft, and is provided with a bore-like bearing socket 9 extending normal to said shaft. The plate-like clip 10 is releasably secured to the carriage by means of the screw 11, the clip overlapping the socket and having a concentric opening 12 of reduced diameter relative to the socket. Within the socket 9, I dispose a short journal 13 having a transverse slot 14 facing the shaft 6 and a stem 15 projecting through the opening 12. The journal 13 is thus free to rotate or oscillate within the socket, the journal being supported by the clip 10.

The transverse slot 14 of the journal is adapted to receive the substantially square disk-like pawl 16, the pawl having four concave right edges or faces 17 for selective coaction with the spiral grooves 18, 18 in the shaft 6. The corners of the pawl are rounded, as shown, and are of outwardly pointing V section to constitute guides 19 for coaction with the grooves.

Figure 5:
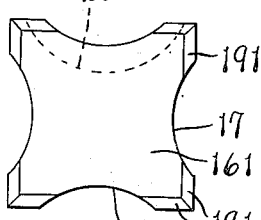
Fig. 5 is a view in side elevation of a modification of the pawl.
Figure 3:
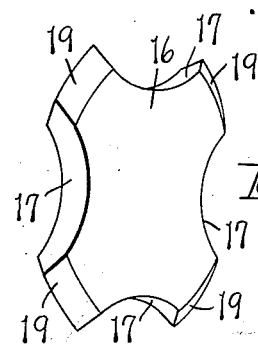
Fig. 3 is an enlarged perspective view of the pawl.
Figure 2:
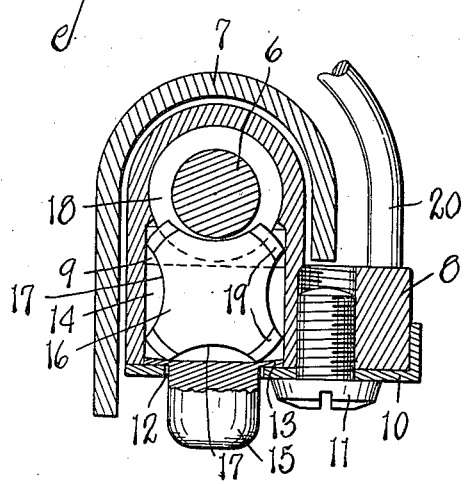
Fig. 2 is an enlarged fragmentary view mainly in section on a line corresponding to line 2—2 of Fig. 1.
Figure 4:
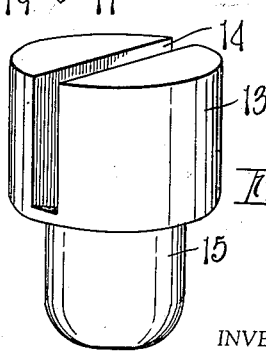
Fig. 4 is an enlarged perspective view of the pawl supporting journal.

In the pawl 161 illustrated by Fig. 5, the corners of the pawl are square so that in case the bearing surface of the pawl wears completely through, as indicated by the dotted line 20, and the pawl is reversed, the locating surfaces resting on the journal 13 are not displaced so as to decrease the height of the pawl. For this reason, I prefer to use the pawl in the shape illustrated by Fig. 5. In this case, the edges 191 at the corners of the pawl constitute the guides for coaction with the grooves.

The journal 13 is preferably formed of rustless, easily machined metal, while the pawl 16 is formed of rustless steel, the latter being capable of quantity production in a punching machine. Likewise, the journals are capable of quantity production in a screw machine, the transverse slots being formed simultaneously with the stems.

The carriage 8 is provided with a line guide eye 20 projecting upwardly at the side of the housing for supporting the carriage against rotative movement on the shaft by coaction with a groove in the frame pillar 21.

With this arrangement, the pawl is supported for coaction with the traversing shaft, the pawl and journal being free to oscillate in the carriage. The pawl can be readily turned to present a new wearing edge 17 to the grooves of the shaft by merely removing the screw 11. In this operation, the stem 15 presents a convenient fingerpiece for holding the parts temporarily in assembled relation.

The stem 15 on the journal 13 can be omitted if desired without interfering with the operation of my device, in which case the opening 12 may be omitted and the clip 10 made imperforate. However, I prefer to provide the journal with the stem for the reason that it greatly facilitates the manipulation of the parts when it is desired to change the position of the pawl.

My pawl assembly can be readily applied to carriages of a type now quite extensively used, it being necessary only to provide a suitable clip or means to support the journal by engagement with the end thereof. My pawl assembly not only holds the pawl effectively in position, but also supports it to receive the thrust and minimize wear thereon.

I have illustrated and described my improvements in an embodiment which I have found very practical. I have not attempted to illustrate or describe other embodiments or adaptations, as it is believed this disclosure will enable those skilled in the art to embody or adapt my improvements as may be desired.

Having thus described my invention, what I claim as new and desire to secure by Letters Patent is:

1. In a reel, the combination with a reversely grooved line guide carriage traversing shaft, of a line guide carriage slidable on said shaft and having a bore-like bearing socket normal to said shaft, a plate-like clip releasably secured to said carriage to overlap said socket and having a concentric opening of reduced diameter relative to said socket, a short journal disposed in said socket and having a transverse slot facing said shaft and a stem projecting through said opening, and a substantially square disk-like pawl disposed in said slot and having four concave right edges for selective coaction with the grooves in said shaft, the corners of the pawl being rounded and of outwardly pointing V section to constitute guides for coaction with the grooves.

2. In a reel, the combination with a reversely grooved line guide carriage traversing shaft, of a line guide carriage slidable on said shaft, and having a bore-like bearing socket normal to said shaft, a plate-like clip releasably secured to said carriage to overlap said socket and having a concentric opening of reduced diameter relative to said socket, a short journal disposed in said socket and having a transverse slot facing said shaft and a stem projecting through said opening, and a substantially square disk-like pawl disposed in said slot and having four concave right edges for selective coaction with the grooves in said shaft.

3. In a reel, the combination with a reversely grooved line guide carriage traversing shaft, of a line guide carriage slidable on said shaft and having a bore-like bearing socket normal to said shaft, a plate-like clip releasably secured to said carriage to overlap said socket and having a concentric opening of reduced diameter relative to said socket, a short journal disposed in said socket and having a transverse slot facing said shaft and a stem projecting through said opening, and a disk-like pawl disposed in said slot and having concave edges for selective coaction with the grooves in said shaft.

4. In a reel, the combination with a reversely grooved line guide carriage traversing shaft, of a line guide carriage slidable on said shaft and having a bore-like bearing socket normal to said shaft, a plate-like clip releasably secured to said carriage to overlap said socket, a short journal disposed in said socket and having a transverse slot facing said shaft, and a substantially square disk-like pawl disposed in said slot and having four concave right edges for selective coaction with the grooves in said shaft, the corners of the pawl being rounded and of outwardly pointing V section to constitute guides for coaction with the grooves.

5. In a reel, the combination with a reversely grooved line guide carriage traversing shaft, of a line guide carriage slidable on said shaft and having a bore-like bearing socket normal to said shaft, a plate-like clip releasably secured to said carriage to overlap said socket, a short journal disposed in said socket and having a transverse slot facing said shaft, and a disk-like pawl disposed in said slot and having concave edges for selective coaction with the grooves in said shaft, the corners of the pawl being rounded and of outwardly pointing V section to constitute guides for coaction with the grooves.

6. In a reel, the combination of a line guide carriage having a bore-like bearing socket, a plate-like clip releasably secured to said carriage to overlap said socket and having a concentric opening of reduced diameter relative to said socket, a short journal disposed in said socket and having a transverse slot facing said shaft and a stem projecting through said opening, and a substantially square disk-like pawl disposed in said slot and having four concave right edges, the corners of the pawl being rounded and of outwardly pointing V section.

7. In a reel, the combination of a line guide carriage having a bore-like bearing socket, a plate-like clip releasably secured to said carriage to overlap said socket and having a concentric opening of reduced diameter relative to said socket, a short journal disposed in said socket and having a transverse slot facing said shaft and a stem projecting through said opening, and a substantially square disk-like pawl disposed in said slot.

8. In a reel, the combination of a line guide carriage having a bore-like bearing socket, a plate-like clip releasably secured to said carriage to overlap said socket, a short journal disposed in said socket and having a transverse slot facing said shaft, and a substantially square disk-like pawl disposed in said slot.

9. In a reel, the combination of a line guide carriage having a bore-like bearing socket, a plate-like clip releasably secured to said carriage to overlap said socket, a short journal disposed in said socket and having a transverse slot facing said shaft, and a four-way pawl disposed in said slot.

10. In a reel pawl assembly, the combination with a short journal having a transverse end slot and a stem, of a substantially square disk-like pawl disposed in said slot and having four concave right edges, the corners of the pawl being rounded and of outwardly pointing V section.

11. In a reel pawl assembly, the combination with a short journal having a transverse end slot, of a substantially square disk-like pawl disposed in said slot and having four concave edges.

12. In a reel pawl assembly, the combination with a short journal having a transverse end slot, of a polygonal disk-like pawl disposed in said slot, each side of said pawl being adapted for selective use with actuating means.

13. In a reel, a substantially square disk-like pawl having four concave right edges, the corners of the pawl being rounded and of outwardly pointing V section.

14. In a reel, a substantially square disk-like pawl having four concave right edges.

15. The combination in a fishing reel having a reversely threaded line guide carriage traversing shaft, of a line guide carriage operatively associated therewith and having a cylindrical pawl socket, a longitudinally slotted cylindrical pawl carrier removably supported in said socket for rotative movement therein, and a flat pawl disposed in said slot in said pawl carrier and supported thereby in operative relation with said shaft, said pawl being symmetrical in shape and having four concave shaft engaging faces whereby the pawl may be selectively positioned in the pawl carrier and socket to support a selected face in operative relation to the shaft.

16. The combination in a fishing reel having a reversably threaded line guide carriage traversing shaft, of a line guide carriage operatively associated therewith, a longitudinally slotted cylindrical pawl carrier removably mounted on said carriage for rotative movement, and a flat pawl disposed in said slot in said pawl carrier and supported thereby in operative relation with said shaft, said pawl being symmetrical in shape and having four concave shaft engaging faces whereby the pawl may be selectively positioned to bring a selected face into operative relation to the shaft.

17. The combination in a fishing reel having a reversably threaded line guide carriage traversing shaft, of a line guide carriage operatively associated therewith, a pawl carrier supported on said carriage for oscillating movement and having a pawl receiving socket, and a pawl having at least three shaft engaging faces disposed in said pawl socket, said faces being symmetrically disposed on said pawl so that the pawl may be selectively positioned in the socket to bring any one of the faces into operative relation to the shaft.

18. The combination in a fishing reel having a reversably threaded line guide carriage traversing shaft, of a line guide carriage operatively associated therewith and having a cylindrical pawl socket, a pawl carrier supported in said socket for rotative movement therein, and a pawl having at least three shaft engaging faces and capable of being selectively positioned in said pawl carrier so that a selected face may be brought into operative relation to said shaft.

19. In a pawl assembly of the character set forth, a square disk-like pawl having four concave right edges, the corners of the pawl being of outwardly pointing V section.

MONROE SHAKESPEARE.